United States Patent [19]

Arnoldt et al.

[11] Patent Number: 4,566,724
[45] Date of Patent: Jan. 28, 1986

[54] DUCT JOINT FRAME

[75] Inventors: Peter J. Arnoldt, Clairton, Pa.; Waldemar H. Greiner, Hamilton, Canada

[73] Assignee: Ductmate Industries, Inc., Pittsburgh, Pa.

[21] Appl. No.: 451,415

[22] Filed: Dec. 20, 1982

[51] Int. Cl.[4] .......................................... F16L 23/00
[52] U.S. Cl. .................................. 285/364; 285/424; 29/157 R
[58] Field of Search ............... 285/424, 406, DIG. 22, 285/363, 364; 29/157 R

[56] References Cited

U.S. PATENT DOCUMENTS

| | | | |
|---|---|---|---|
| 1,661,674 | 3/1928 | Osborn | 285/DIG. 22 X |
| 3,091,487 | 5/1963 | Gallagher et al. | 285/406 X |
| 3,170,544 | 2/1965 | Kinkead et al. | 285/424 X |
| 3,415,543 | 12/1968 | Keating | 285/424 X |
| 3,460,859 | 8/1969 | Keating | 285/424 X |
| 3,482,861 | 12/1969 | Keating | 285/424 X |
| 3,630,549 | 12/1971 | Grimm | 285/364 X |
| 4,123,094 | 10/1978 | Smitka | 285/424 X |
| 4,218,079 | 8/1980 | Arnoldt | 285/424 X |
| 4,252,350 | 2/1981 | Smitka | 285/424 X |
| 4,288,115 | 9/1981 | Sullivan | 285/424 X |
| 4,508,376 | 4/1985 | Arnoldt | 285/424 X |

FOREIGN PATENT DOCUMENTS

| | | | |
|---|---|---|---|
| 2434160 | 1/1976 | Fed. Rep. of Germany | 285/424 |
| 2758295 | 6/1979 | Fed. Rep. of Germany | 285/424 |

Primary Examiner—Thomas F. Callaghan
Attorney, Agent, or Firm—Stanley J. Price, Jr.

[57] ABSTRACT

A plurality of flange members are positioned oppositely of one another on the ends of a pair of generally rectangular sheet metal ducts. The flange members are positioned in pairs on the adjacent ends of the ducts. The angular legs of corner pieces extend into the ends of the flange members to connect the adjacent flange members on the end of each duct so that four corner pieces connect the flange members to form a frame around the respective duct end portion. The oppositely positioned flange members on the adjacent duct end portions are sealingly secured together by clamping together the adjacent corner pieces. Each flange member is formed by a thin walled sheet member and includes a pair of legs angularly disposed relative to one another to form a plurality of wall sections. A first wall section terminates in a first leg end portion, and a second wall section terminates in a second leg end portion. The first and second leg end portions are spaced apart. The first and second wall sections are positioned in overlying relation to receive the duct end portion therebetween. The duct end portion overlies the second wall section which extends around and below the duct end portion to a stop on the second leg end portion. The stop engages a plurality of protuberances or dimples on the surface of the duct adjacent the duct end portion to prevent retraction of the duct end portion from the flange member. The first leg end portion forms an abutment shoulder, and the duct end portion engages the abutment shoulder. Thus, the duct is rigidly secured between the stop and the abutment shoulder, thereby, eliminating freedom of movement between the flange wall sections to provide a torsionally rigid connection of each flange member to the duct end portion that resists bending of adjacent flange members away from each other to prevent air leakage at the duct joint.

18 Claims, 6 Drawing Figures

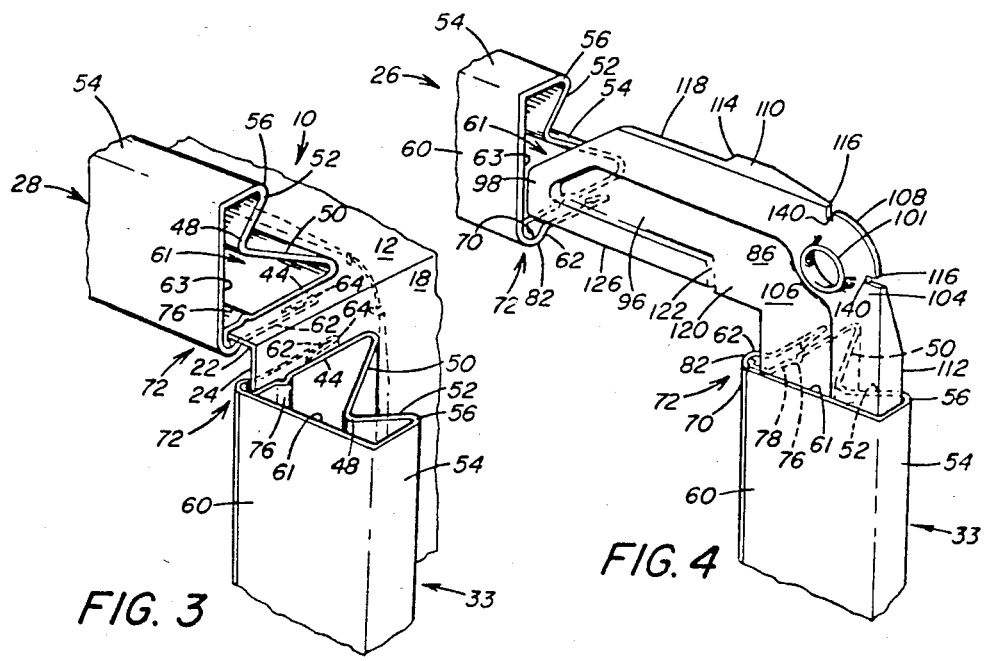
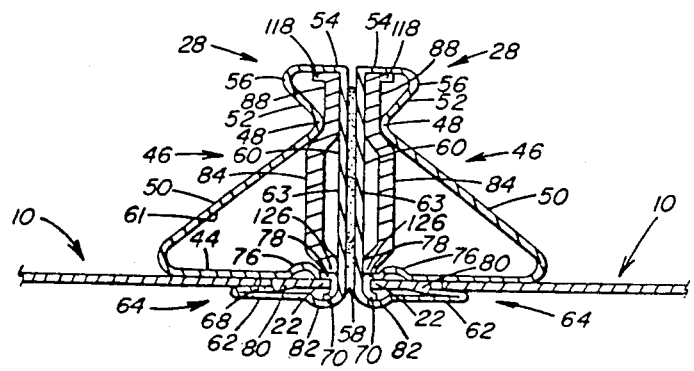
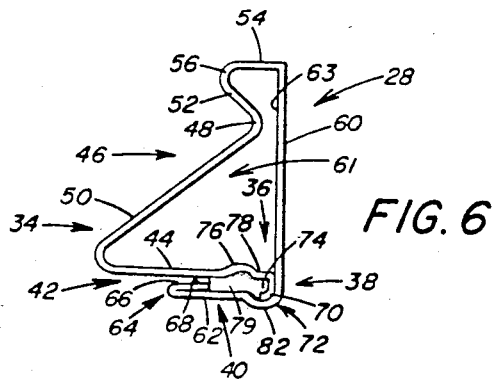

DUCT JOINT FRAME

BACKGROUND OF THE INVENTION

1. Field of the Invention

This invention relates to a duct joint frame for connection to the end portion of a generally rectangular duct, and more particularly, to a duct joint frame having a plurality of angular wall sections adapted to frictionally engage the duct end portion and thereby rigidly and sealingly connect the flange member to the duct end portion.

2. Description of the Prior Art

It is well known, as disclosed in U.S. Pat. Nos. 4,218,079 and 4,288,115, to connect the ends of rectangular heating and air conditioning ducts by flange portions which are secured by welding, riveting, dimpling, or the like to the duct end portions. The flange portions include a vertical or upstanding channel for receiving the right angle leg of a corner piece. A gasket is positioned between the upstanding channels of a pair of duct end portions to be connected.

Corner pieces extend into the upstanding channels to connect adjacent channels on each duct end portion. The flanges on the adjacent duct end portions are connected by bolts which extend through aligned holes in each corner piece. Nuts are tightened on the bolts to urge the legs of the corner pieces together so as to apply a compressive force upon the upstanding channels and, thereby, compress the gasket between the upstanding channels to form a seal around the adjacent duct end portions.

Each flange portion includes a duct receiving leg that extends at a substantially right angle from the upstanding channel-shaped leg that receives the respective leg portion of the corner piece. The duct receiving leg includes a top wall abutting a bottom wall. The duct end portion slides between the top and bottom walls. This is done manually in most cases and requires initial clamping of the duct receiving leg portion to the duct end portion so that the duct end portion is properly positioned before it is welded to the flange portion. This is a time consuming task which requires the efficient coordination between a number of workmen to initially assemble the flange portion on the duct end portion, clamp the flange portion in position before it is welded and, thereafter, spot weld the flange portion to the duct end portion. This operation must be repeated for each flange portion that is connected to the duct end portion. Thus, for assembling one duct joint, two frames formed by eight flange portions must be assembled by inserting the corner pieces in the flange portions and then the frames clamped together and welded on the duct end portions and corner pieces bolted together to complete the joint.

U.S. Pat. Nos. 3,415,543; 3,460,859 and 3,482,816 disclose duct coupling frames for connecting a pair of duct end portions. A hollow frame overlies the sections to be joined and includes a pair of reversely folded legs which define opposed duct receiving channels. The legs end in locking lips which extend toward the duct end portion. The duct end portion is provided with locking tabs spaced around the periphery of the duct. The locking lips of the frame engage the locking tabs of the duct to prevent the respective duct end portions from being pulled out of the duct receiving channel. Even though the duct is snapped in place within the receiving channel of the hollow frame, the duct end portion does not abut a rigid member of the frame. In many cases, rivets and lock screws are also used to assure that the duct remains connected to the frame.

While it has been suggested to provide the above described "snap-in" type joints, the known arrangements still require some sort of fastening means to prevent separation of the ducts from the connecting frame. Furthermore, the known "snap-in" type duct joints do not provide a sufficiently rigid connection to resist bending of the connected ducts when subjected to high pressure air flow even after their connection to the duct end portions. Even though the duct frame locking lips restrain retraction of the duct from the frame, the duct end portion is not rigidly supported in the duct receiving leg.

Therefore, there is a need, in a duct joint, for a frame operable to be snapped in place on a duct end portion in a manner to rigidly support the duct end portion in the frame to prevent movement of the duct in the frame and resultant leakage without having to weld, bolt, or rivet the frame to the duct end portion.

SUMMARY OF THE INVENTION

In accordance with the present invention, there is provided a duct joint frame for connection to the end portion of a generally rectangular duct that includes a plurality of flange members. Each flange member is formed by a thin walled sheet of material and includes a first leg having an end portion and a second leg having an end portion. The first leg end portion is laterally spaced from the second leg end portion. The leg portions are bent relative to one another to form a plurality of wall sections. A first wall section terminates at the first leg end portion and a second wall section terminates at the second leg end portion. The first and second wall sections are positioned in overlying relation to receive an end portion of a duct therebetween. The second wall section includes means for restraining forward advancement of the duct end portion between the first and second wall sections. The second leg end portion forms a stop for abutting protuberances on the surface of the duct adjacent the duct end portion to prevent retraction of the duct end portion from between the first and second wall sections. The stop is laterally spaced a fixed dimension from the second wall section to maintain the duct end portion rigidly secured between the stop and the second wall section.

Further in accordance with the present invention, there is provided a method of connecting a duct joint frame to the end portion of a generally rectangular duct that includes the steps of positioning a first wall section of a frame member in overlying relation with a second wall section of the frame member to receive the duct end portion therebetween. The duct end portion extends between the first and second wall sections. Forward movement of the duct end portion is restrained by abutting contact with the frame member. The second wall section engages the protuberances or dimples on the surface of the duct adjacent the end portion thereof to prevent retraction of the duct from between the first and second wall sections. The duct is maintained rigidly connected to the first and second wall sections so that the duct end portion remains fixed in abutting relation with the frame member.

Accordingly, the principal object of the present invention is to connect adjacent duct end portions by a generally rectangular frame that snaps in place to rigidly connect the frame to the duct end portion in a manner which minimizes torsional distortion of the frame and bending of the joined ducts and, thus, resists displacement of the duct end portions from the frame and resultant leakage due to the forces exerted on the frame when air flows through the ducts.

Another object of the present invention is to provide a method for connecting a pair of duct end portions by a frame that includes a plurality of flange members each including a plurality of angularly disposed wall sections which are rigidly connected to the duct end portions to prevent displacement of the duct end portions from the flange members under load.

A further object of the present invention is to provide a duct joint assembly and a method of assembling a duct joint in which a plurality of flange-like frames are locked in place on adjacent duct end portions to sealingly connect the duct end portions with sufficient rigidity to resist separation of the ducts and air leakage without having to weld or bolt the ducts to the flange members and without having to use a cleat to connect adjacent flange members in the duct joint.

These and other objects of the present invention will be more completely disclosed and described in the following specification, the accompanying drawings and the appended claims.

BRIEF DESCRIPTION OF THE DRAWINGS

FIG. 3 is a perspective view of a corner of a duct with a pair of adjacently positioned flange members secured thereto, illustrating in phantom a corner piece connecting the adjacent flange members.

FIG. 4 is an enlarged, perspective view of an angular corner piece for connecting adjacent flange members, illustrating one leg of the corner piece extending into the flange member and the opposite leg entering the opening of the flange member.

FIG. 5 is a view in section of a pair of oppositely positioned flange members snapped onto the adjacent ends of a pair of ducts to be connected, illustrating the corner pieces extending into the flange members.

FIG. 6 is a view in side elevation of a flange member, illustrating the profile of the flange member.

DESCRIPTION OF THE PREFERRED EMBODIMENTS

Figure 1:
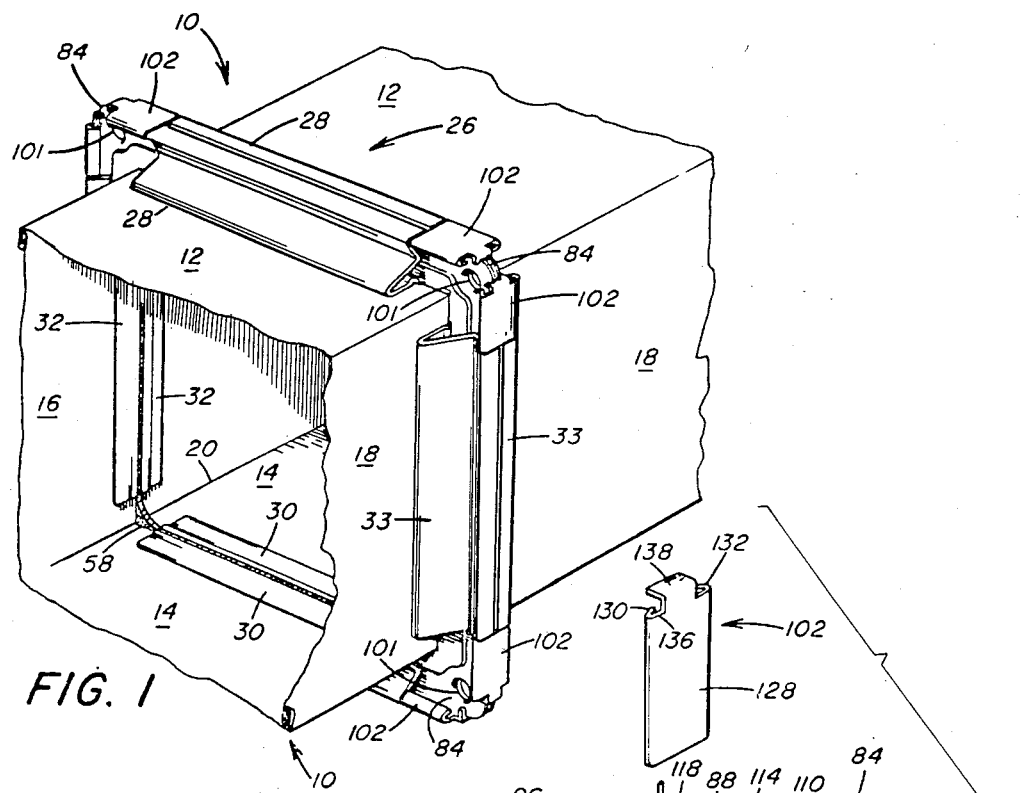
FIG. 1 is a perspective view of a duct joint.

Referring to the drawings, and particularly to FIG. 1, there is illustrated the end portions of a pair of ducts generally designated by the numeral 10 in which each duct 10 has an upper wall 12, a lower wall 14 and a pair of vertical walls 16 and 18. The ducts 10 are formed with a longitudinally extending, sealed corner joint 20 between the lower wall 14 and the side wall 16. As illustrated in FIG. 3, the upper wall 12 terminates in an end portion 22 and the side wall 18 terminates in an end portion 24. Similarly, the walls 14 and 16 terminate in end portions, which extend along a plane transverse to the longitudinal axis of the duct 10. Each of the ducts 10 preferably is fabricated from galvanized sheet material having a thickness which may vary along the length of the duct so that the duct 10 is not completely uniform along its entire length.

The end portions of the pair of ducts 10 are secured to each other by a pair of frames generally designated by the numeral 26. The frames 26 sealingly engage the duct end portions, and the pair of frames 26 are clamped together, as illustrated in FIG. 1, to sealingly connect the pair of ducts 12. It should be understood that the frames 26 may also be connected by the bolting together of angular corner pieces, whih are secured to the frames as described in U.S. Pat. No. 4,218,079.

Each frame 26 is formed by a plurality of duct connecting flange members that extend outwardly from the respective duct end portion and includes an upper flange member 28, a lower flange member 30 and a pair of side flange members 32 and 33. The configurations of the flange members 28-33 are identical, as will be described hereinafter in greater detail in accordance with the present invention. The profile of the flange member 28 illustrated in FIG. 6 is representative of the other flange members 30, 32 and 33. The flange members 28-33 are preferably cut to a preselected length from an elongated sheet metal strip that is rolled into a flanged configuration having the profile illustrated in FIG. 6.

The position of opposed flange members 28 illustrated in FIG. 5 to connect the end portions of adjacent ducts 10 is representative of the position of the other opposed pairs of the flange members 30, 32 and 33 in a duct joint as shown in FIG. 1. The flange member 28 shown in detail in FIG. 6 includes a first leg 34 having an end portion 36 and a second leg 38 having an end portion 40. The legs 34 and 38 are roll formed from an elongated sheet metal strip into the bent profile illustrated in FIG. 6 in which the first leg end portion 36 is laterally spaced from the second leg end portion 40 to form a duct receiving channel generally designated by the numeral 42 in FIG. 6. The channel end portions 36 and 40 form free end portions for the respective flange member prior to assembly of the duct end portion in the flange member 28.

Figure 2:
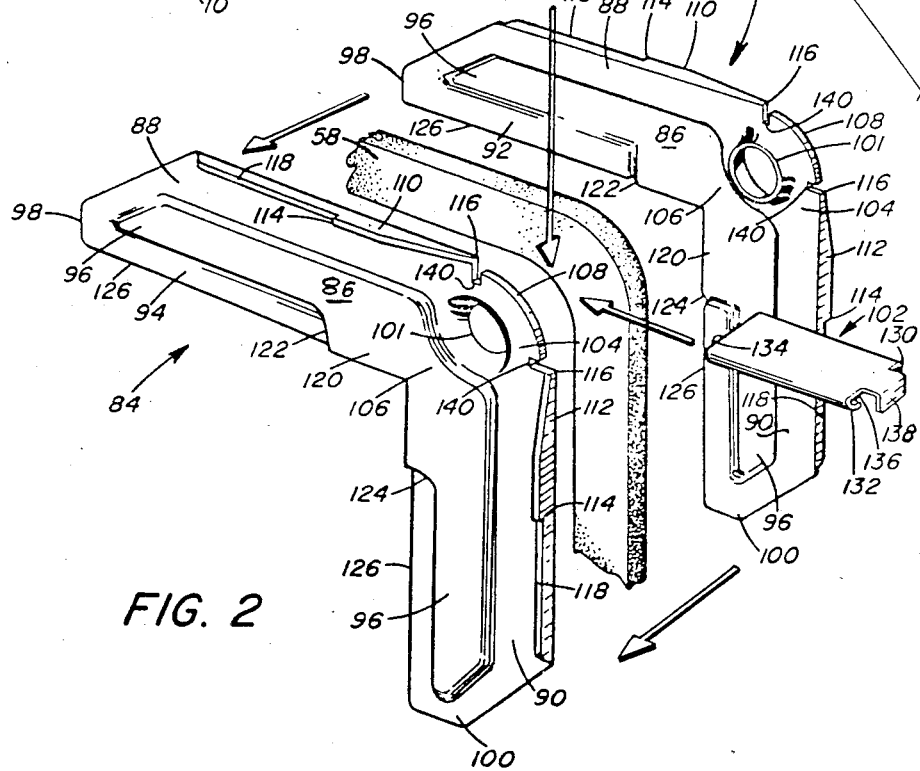
FIG. 2 is an exploded, isometric, fragmentary view of a pair of corner pieces illustrating gasket material, which is compressed between the pair of corner pieces when inserted in the ends of the flange members and connected by a pair of channel-shaped clamps.

The sheet metal strip is roll formed into a channel configuration having the legs 34 and 38 angularly disposed relative to one another to form a plurality of wall sections. Extending from the first leg end portion 36 is a bottom wall section 44 that is connected to a rear wall section generally designated by the numeral 46. The rear wall section 46 extends at an acute angle upwardly from the bottom wall 44. The rear wall 46 is angularly bent about an apex 48 to provide a first wall portion 50 having a length greater than a second wall portion 52. The second wall portion 52 extends upwardly at an acute angle relative to a horizontal axis through the apex 48 and is connected to a top wall 54. A shoulder 56 is formed between the wall portion 52 and the top wall 54. The shoulder 56 is adapted to receive a longitudinal clip or cleat (not shown) that is positioned over abutting flanges when arranged, as illustrated in FIG. 5, to urge the flanges together and compress therebetween a relatively thin gasket 58, which is illustrated in FIGS. 1, 2 and 5. Use of the cleat is optional.

The flange top wall 54 extends from the shoulder 56 a preselected width to a front wall 60. The front wall 60 is positioned substantially perpendicular to the top wall 54 and extends downwardly therefrom the height of the frame member 28. In roll forming the profile of the flange members 28-33, the front wall 60 is spaced from the rear wall portions 50 and 52 by the top wall 54 to provide a longitudinally extending cavity 61 for the legs of angular corner pieces to be described later in greater detail.

During the roll forming process, the flange member second leg 38 is bent at substantially a right angle at the base of the front wall 60 so as to form a locking wall 62 positioned substantially perpendicular to the front wall 60. The locking wall 62 underlies the bottom wall 44 that is part of the frame first leg 34. Thus, the locking wall 62 is positioned substantially horizontally in the orientation of the flange member 28 illustrated in FIG. 6. Further, in roll forming the profile of the flange member 28, the locking wall 62 is spaced a preselected distance below the bottom wall 44 to slidably receive the duct end portion between the walls 44 and 62.

Preferably, the locking wall 62 includes an inturned rebent portion generally designated by the numeral 64. The inturned rebent portion 64 includes an upper leg 66 terminating in a longitudinally extending edge portion 68 that forms a stop means for preventing retraction of the duct end portion from between the walls 44 and 62, as will be explained later in greater detail. The edge portion 68 extends the length of the flange member 28 and is positioned in spaced relation and substantially parallel to the longitudinally extending shoulder or rib 76 to be later described. With this arrangement, as illustrated in FIG. 5, the duct end portion is frictionally engaged between the bottom wall 44 and the upper leg 66 of the inturned rebent portion 64.

The bottom wall 44 of the first leg end portion 36 terminates in a longitudinally extending, downward edge portion 70. The edge portion 70 extends in an angular configuration downwardly in abutting relation with the lowermost portion of the front wall 60 and away from the front wall 60 into overlapping, abutting relation with the front end of the locking wall 62. The position of the edge portion 70 is fixed by abutting contact with the lower end of the front wall 60 to form an abutment shoulder generally designated by the numeral 72 at the juncture of the front wall 60 and the locking wall 62. The shoulder 72 is inturned to provide a pocket 74, that extends longitudinally the length of the frame member 28 and transversely from the edge portion 68 of the rebent portion 64 to the downturned edge portion 70 of the wall 44.

In the roll forming of the profile of the flange member 28 shown in FIG. 6, the bottom wall 44 is provided adjacent the abutment shoulder 72 with a shoulder or rib 76 that projects upwardly from the surface of the bottom wall 44 into the channel or cavity 61. The rib 76 also extends the length of the flange member 28. The rib 76 is spaced a preselected lateral distance from the front wall 60 to provide a corner piece leg receiving surface 78. The rib 76 is positioned substantially parallel to the front wall 60 and is spaced a preselected distance from the front wall 60 to permit the edge of a corner piece leg to rest on the surface 78 as shown in FIG. 5. The rib 76 also maintains the corner piece in secure abutting relation with the front wall 60 in a manner to resist torsional distortion of the frame member 28.

The pocket 74 formed by the overlapping of the bottom wall edge portion 70 with the locking wall 62 extends longitudinally the length of the flange member 28 and is adapted to receive a sealant material 79 (shown in FIG. 6) having a viscosity that permits the material to flow into position by application from a nozzle into the pocket 74. The sealant material 79 is not shown in FIGS. 3-5 for purposes of clarity of illustration. However, as illustrated in FIG. 6, the sealant material 79 fills the pocket 74 from the bottom wall edge portion 70 to the edge portion 68 of the rebent portion 64. Thus, the rebent portion 64 serves to retain the sealant material 79 in the pocket 74 which permits a substantial amount of sealant material 79 to be inserted and retained in the pocket 74. When the duct end portion is inserted between the walls 44 and 62 and into the pocket 74, the sealant material 79 underlies and overlies the duct end portion back to the rebent portion 64. Thus, with the profile of the flange member 28, the sealant material 79 more effectively sealingly connects the duct end portion to the flange member to form an air-tight seal around the end of the duct within the flange member.

With the above-described profile of the flange member 28 illustrated in FIG. 6, the rear wall portions 50 and 52 are angled from the apex 48 away from the front wall 60 and further spaced at their end portions from the front wall 60 by the top wall 54 and the bottom wall 44 to provide the channel 61 with the wall portions 44, 50, 52, 54 and 60 which are widely spaced from one another to enhance the torsional rigidity of the flange member 28. Thus, in accordance with the present invention, the wall members 44, 50, 52, 54, 60 and 62 are substantially spaced apart to provide the flange member 28 with substantially improved structural rigidity operable to more effectively resist torsional distortion, particularly after the duct joint has been assembled and the joined duct is subjected to load conditions when air flows through the joined ducts.

With the flange member profile configuration of the present invention, rigidity about the X-axis or horizontal axis of the flange member, as seen in FIGS. 5 and 6, is substantially improved to minimize deflection or distortion due to bending. This structure overcomes the problems encountered with known profile configurations which, under load conditions, experience torsional distortion at the duct end portion resulting in separation of the abutting flange members in an assembled joint. Separation of the flange members under the effects of torsion due to loading results in leakage at the duct joint. However, with the profile configuration of the present invention, the rigidity of the flange members is substantially improved to resist torisional distortion about the duct end portion under load conditions. Torsional distortion is further resisted by the locking engagement of the duct end portion to the respective flange members, as illustrated in FIGS. 3 and 5 by the elimination of the freedom of movement of the first leg end portion 36 relative to the second leg end portion 40 upon insertion of the duct end portion in the flange member.

Prior to connection of the respective flange members to the duct end portions, there is no rigid connection between the end portions 36 and 40 of the legs 34 and 38, as illustrated in FIG. 6. However, upon assembly of the duct joint, the leg end portions 36 and 40 are rigidly connected by means of the duct end portion. This arrangement converts the flange member 28 from an "open channel section" where the leg end portions 36 and 40 and, more particularly, the edges 68 and 70 are not connected to each other and are free to move relative to each other to a "closed channel section" where the end portions 36 and 40 are rigidly connected to each other by the positioning of the duct end portion between walls 44 and 62 in the pocket 74. In the assembled duct joint, the flange edge 68 abuts a plurality of duct protuberances 80, and the flange edge 70 abuts the duct end portion. This manner of connecting the duct end portion to the flange member substantially increases the torsional rigidity of the flange member to resist separation in an assembled duct joint of the abutting front walls 60 under load conditions when air is being circulated through the joined ducts.

The duct end portion is provided with a suitable locking means formed by dimpling or deforming by cutting or piercing of the duct at spaced intervals around the periphery of the duct to form a plurality of protuberances 80. Thus, in a rectangular duct, the protuberances are spaced apart and extend around the entire periphery of the duct end portion on the upper wall 12, lower wall 14 and side walls 16 and 18. The protuberances 80 shown in FIG. 5 are representative of the protuberances 80 provided on each wall of the duct adjacent the end portion thereof. The protuberances 80 are operable as stops engageable with the edge portion 68 of the locking wall inturned rebent portion 64. Preferably, the protuberances 80 have a configuration to facilitate unobstructed insertion of the duct end portion between the bottom wall 44 and the locking wall 62 so that the duct end portion can abut the shoulder 72. With the duct end portion in place, the protuberances 80 abut the flange edge portion 68 to prevent retraction of the duct end portion from the flange member. The protuberances 80 are spaced a preselected distance from the extreme end of the duct so that when the end of the duct abuts the shoulder 72, the protuberances 80 abut the edge portion 68.

In the case of forming the protuberances 80 by piercing the duct end portion and, thereby, forming apertures in the duct, the sealant material 79 in the pocket 74 fills the apertures and the apertures are thus sealed to prevent air from passing through them. To facilitate the reception of the duct end portion into abutting relation with the shoulder 72, the frame locking wall 62 is displaced downwardly to provide a recess 82 for receiving the edge portion 70. The recess 82 has a depth selected to assure that the edge portion 70 does not extend above the plane of the upper surface of the locking wall 62. Most preferably, the recess 82 has a depth equal to the thickness of the sheet metal forming the flange member. This assures that there is no interference of the edge portion 70 with the duct end portion which would prevent the duct end portion from extending into abutting relation with the shoulder 72.

The abutting of the duct end with the shoulder 72 and the engagement of the stop formed by the edge portion 68 engaging the protuberances 80 provides a rigid connection of the edge portion 68 to the shoulder 72 by the duct end portion. In this manner, a "snap-in" type connection is made between the duct end portion and the flange member. The "snap-in" connection eliminates the need to connect the duct end portion to the flange member by welding, riveting, dimpling or the like. With the present invention, the duct end portion is locked to the flange member in a manner which assures sealing connection of the flange member to the duct end portion. The connection rigidly engages the free edges 68 and 70 of the flange member to the duct so that the flange member, when connected to the duct, is more operable to resist torsional distortion about the duct end portions under load conditions.

As illustrated in FIG. 1, and further in greater detail in FIGS. 2–4, pairs of adjacently positioned flange members 28–33 on the respective duct end portions, are connected to one another by angular corner pieces 84. The corner pieces are illustrated in detail in FIG. 2 and have a generally planar configuration. Each corner piece 84 has a body portion 86 with a pair of legs 88 and 90 extending angularly therefrom and an upper planar surface 92 and a lower planar surface 94. Each corner piece 84 has elongated, recessed portion 96 which extends from a front edge 98 of the leg 88 to the body portion 86 and continue through the body portion 86 along the other leg 90 to a location adjacent an opposite leg end portion 100.

The body portion 86 has an aperture 101 arranged to receive a conventional nut and bolt for connecting adjacent corner pieces 84 or, in the alternative, the adjacent corner pieces 84 can be clamped together, as illustrated in FIG. 1, by pairs of clamps 102 that do not require bolting. The body portion 86 of each corner piece 84 has an outer corner section 104 and an inner corner section 106. The outer corner section 104 includes an arcuate portion 108 that is cut away from a pair of flanges 110 and 112 that extend on the outer edge of the body portion 86 from the outer corner section 104 to the respective legs 88 and 90.

Each of the flanges 110 and 112 has opposite shoulders 114 and 116. Shoulder 114 is adjacent the respective leg portion and the shoulder 116 is adjacent the outer corner section 104. The body portion 86 of each corner piece terminates at the flange shoulders 114. Extending from the shoulders 114 is an outer flanged edge 118 on each leg 88 and 90.

Extending from the inner corner section 106 of the body portion 86 is a corner flange portion 120 that is displaced or offset from the legs 88 and 90 in a manner set forth in greater detail in United States patent application Ser. No. 327,934. The corner flange portion 120 has end portions 122 and 124 that are downset from an inner edge 126 on each leg 88 and 90 so that the surface of the corner flange portion 120 is in a plane displaced from the upper and lower planar surfaces 92 and 94 of legs 88 and 90.

With the above-described arrangement of each corner piece 84, the legs 88 and 90 are positioned in the cavities 61 of adjacent flange members 28 and 33 on the duct end portions 22 and 24, as illustrated for example in FIG. 3. The top walls 54 of the frame members serve as a stop to receive the corner piece shoulders 114 on the flanges 110 and 112. Thus, only the legs 88 and 90 extend into the flange members 28 and 33 with the corner piece body portion 86 extending out of the flange members 28 and 33.

As illustrated in FIG. 4 before the duct end portions 22 and 24 are received between the flange member walls 44 and 62, the corner piece leg portions 88 and 90 are inserted in the flange member cavity 61 between the front wall 60 and the apex 48 of each flange member. As illustrated in FIG. 5, the spacing between the front wall 60 and the apex 48 is approximately equal to the thickness of the leg portions 88 and 90 so that the leg portions are urged by the apex 48 into secure abutting relation with the front wall 60. The entire portion of each leg portion 88 and 90 is positioned in the respective flange member and abuts the inner surface of the front wall 60 above the apex 48.

As illustrated in FIG. 5, the engagement of the apex 48 with the respective leg portion 88 maintains the upper edge of the leg 88 abutting the undersurface of the horizontal top wall 54 and the outer surface of the leg 88 abutting the inner surface 63 of the front wall 60. The lower edge 126 rests on the leg receiving surface 78 of the bottom wall 44 adjacent the front wall 60. The outer surface of the leg 88 above the surface 78 also abuts the inner surface of the front wall 60. The shoulder 76 prevents the lower edge 126 of the corner piece leg 88 from shifting or twisting within the profile during installation or in use. With this arrangement, the corner piece legs 88 and 90 are maintained in abutting relation with the horizontal top wall 54, the surface 78 of the bottom wall 44, and the front wall 60. This provides a rigid, sturdy connection between the corner piece legs 88 and 90 and the respective flange members that is not likely to be torsionally distorted.

After the corner piece legs 88 and 90 are secured within the flange members 28-33 to form the frame 26, the duct end portion is inserted into the connected flange members 28-33. Due to the lateral displacement of the corner piece corner flange portions 120 from the corner piece legs 88 and 90, the flange portions 120 are spaced above the flange walls 62 to provide clearance for the duct end portion to extend beneath the flange portions 120. The duct end portion also extends beyond the flange portions 120, as well as, the planar surface of legs 88 and 90 to a position abutting the shoulders 72 in the flange members 28-33. With the duct end portion in this position, the portion of the duct end portion in the flange members 28-33 penetrates the sealant material 79, and the portion of the duct end portion out of the flange members 28-33 opposite the corner section flange portions 120 penetrates the gasket 58. Thus, the duct end portion is effectively sealed within the flange members 28-33 and outside the flange members 28-33 at the four corners of the duct end portion.

Once the pairs of adjacent duct end portions are connected to the frames 26, the pair of frames 26 are positioned in abutting relation with the gasket 58 therebetween. The oppositely positioned pairs of corner pieces 84 are connected by the clamps 102. A pair of clamps 102 secure together a pair of corner pieces 84 at each corner of the connected ducts 10, as illustrated in FIG. 1. Clamping together the corner pieces 84 by use of the clamps 102 eliminates the use of nuts and bolts and thus avoids the problems encountered by the spreading apart of the corner piece legs 88 and 90 in the flange members when the bolts are tightened on the nuts.

As illustrated in detail in FIG. 2, each clamp 102 has a longitudinally extending, channel-shaped body portion 128 having a pair of downwardly depending, arcuately shaped side walls 130 and 132. The clamp body portion 128 has a first end portion 134 that opens into a channel 136 which is closed at the opposite end portion by an end wall 138. The channel 136 of the clamp 102 has a width between the side walls 130 and 132 permitting the clamp 102 to be forcibly, slidably movable on the abutting flanges 110 and 112 with the gasket 58 positioned between the pairs of flange members 28 and 30 and corner pieces 84.

As illustrated in FIG. 2, each clamp 102 is initially positioned so that the open end of the channel 136 is positioned opposite the abutting flanges 110 and 112. The clamp side walls 130 and 132 are positioned oppositely of the free edges of the flanges 110 and 112. The clamps 102 are inserted, one at a time, on the flanges 110 and 112 of the adjacent pairs of corner pieces 84 at each corner of the connection between the ducts 10. Each clamp 102 is forced onto the adjacent pairs of corner pieces 84 so as to tightly compress the corner pieces 84 together at the flanges 110 and 112. With this arrangement, compressive forces are applied at the corner pieces 84 closely adjacent the openings into the flange members 28-33.

Each clamp 102 is forcibly advanced on the outer flanges 110 and 112 until the clamp end portion 134 abuts or is positioned closely adjacent the top wall 54 and the shoulder 56 of abutting pairs of flange members and the clamp end wall 138 drops down into a slot or recess 140 provided on each corner piece corner section 104 at the shoulder 116 of the flanges 110 and 112. Thus, the clamp 102 is securely held in clamped engagement on the respective pairs of corner pieces 84. Forcing each clamp 102 on the outer flanges 110 and 112 urges the corner piece legs together, thereby compressing the gasket 58 between the abutting flange portions 28-33 and the corner pieces to seal around the duct end portions and the corners of the ducts. In this manner, the clamps 102 are operable to improve the sealing around the duct end portions by the application of clamping forces upon the corner pieces over a considerable distance that extends along the outer flanges 110 and 112. This arrangement also serves to exert increased compressive forces upon the adjacent corner pieces 84 to resist, in addition to the above-discussed profile configuration of the flange members 28-33, torsional distortion of the flange members 28-33 under load conditions.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A duct joint frame for connection to the end portion of a generally rectangular duct comprising,
   a plurality of flange members,
   each of said flange members having a front wall, said flange members formed by a thin walled sheet of material including a first leg having an end portion and a second leg having an end portion,
   said first leg end portion being laterally spaced from said second leg end portion,
   said leg portions beng bent relative to one another to form a plurality of wall sections,
   a first wall section terminating at said first leg end portion,
   a second wall section terminating at said second leg end portion,
   said first and second wall sections being positioned in overlying relation to receive an end portion of a duct therebetween,
   said first wall section including an abutment shoulder for receiving and restraining forward advancement of the duct end portion between said first and second wall sections,
   said abutment shoulder abutting a portion of said second wall section at a fixed distance from the front wall of said flange member,
   said second leg end portion forming stop means for engaging protuberances on the surface of the duct adjacent the duct end portion to prevent retraction of the duct end portion from between said first and second wall sections, and
   said stop means being laterally spaced a fixed dimension from said abutment shoulder to maintain the duct end portion rigidly secured between said stop means and said abutment shoulder with said duct end portion a preselected fixed distance from said flange member front wall and said duct end portion connecting said first leg end portion to said second leg end portion and rigidifying said flange member.

2. A duct joint frame as set forth in claim 1 which includes, said second wall section including a front wall extending upwardly from said abutment shoulder, said front wall being positioned in rigid contact with said abutment shoulder, said abutment shoulder being inturned to form a pocket extending the length of said flange member, said pocket being structurally reinforced by said front wall, said pocket arranged to receive the duct end portion, and said pocket being adapted to receive a sealant material retained in said pocket the length of said flange member to sealingly connect the duct end portion to said flange member.

3. A duct joint as set forth in claim 1 in which, said second leg end portion extends horizontally below the duct end portion to said stop means, said stop means including an inturned edge portion extending the length of said flange member, and said edge portion being engageable with the protuberances on the surface of the duct to prevent retraction of the duct end portion from said flange member.

4. A duct joint as set forth in claim 3 in which, said inturned edge portion rigidly engages the protuberances on the surface of the duct within said flange member, and said inturned edge portion exerting a force upon the duct end portion to maintain a rigid connection of the duct with said flange member from said inturned edge portion a fixed dimension to said second wall section.

5. A duct joint as set forth in claim 1 in which, said second leg end portion extends horizontally below the duct end portion to form a locking wall, said locking wall terminating in said stop means including an edge portion extending the length of said flange member, and said edge portion exerting a force upon the duct end portion to maintain the duct end portion in fixed abutting relation with said frame member opposite said second wall section.

6. A duct joint frame for connection to the end portion of a generally rectangular duct comprising, a plurality of flange portions extending upwardly from the end portion of the duct, each of said flange portions being formed by a thin walled member including a first leg having an end portion and a second leg having an end portion, said first leg end portion being laterally spaced from said second leg end portion to form a channel having opposite open end portions, said leg portions being bent relative to one another to form a plurality of wall sections, a plurality of angular corner pieces for connecting adjacent flange portions for forming a frame around the duct end portion, said corner pieces each having a body portion and a pair of leg portions extending angularly from said body portion, each of said leg portions having an upper edge portion and a lower edge portion, said pair of leg portions arranged to extend into said open end portions of said flange portions to connect adjacent flange portions on the duct end portion, a front wall section extending upwardly from said first leg end portion, said front wall section having an upper end portion, said pair of corner piece leg portions extending into abutting relation with said front wall sections of adjacent flange portions on the duct end portions, abutment means positioned oppositely of said upper end portion of said front wall section and in engagement with said corner piece leg portion for urging said upper edge portion of said corner piece leg portion against said front wall section, a bottom wall section extending substantially horizontally from said front wall section, said bottom wall section arranged to receive said lower edge portion of said corner piece leg portion, and said bottom wall including a shoulder spaced from said front wall section and abutting said lower edge portion of said corner piece leg portion to maintain said lower edge portion in contact with said front wall section.

7. A duct joint assembly for connecting the end portions of generally rectangular ducts comprising, a plurality of flange portions extending upwardly from the end portion of a duct, each of said flange portions being formed by a thin walled member including a first leg having an end portion and a second leg having an end portion, said first leg end portion being laterally spaced from said second leg end portion to form a channel having opposite open end portions, said leg portions being bent relative to one another to form a plurality of wall sections, a plurality of angular corner pieces for connecting adjacent flange portions for forming a frame around the duct end portion, said corner pieces each having a body portion and a pair of leg portions extending angularly from said body portion, each of said leg portions having an upper edge portion and a lower edge portion, said pair of leg portions arranged to extend into said open end portions of said flange portions to connect adjacent flange portions on the duct end portion, a front wall section extending upwardly from said first leg end portion, said front wall section having an upper end portion, said pair of corner piece leg portions extending into abutting relation with said front wall sections of adjacent flange portions on the duct end portions, abutment means positioned oppositely of said upper end portion of said front wall section and in engagement with said corner piece leg portion for urging said upper edge portion of said corner piece leg portion against said front wall section, stop means positioned above said abutment means for receiving said upper edge portion of said corner piece leg portion above said abutment means, a bottom wall section extending substantially horizontally from said front wall section, said bottom wall section arranged to receive said lower edge portion of said corner piece leg portion, said bottom wall section including a shoulder spaced from said front wall section and abutting said lower edge portion of said corner piece leg portion to maintain said lower edge portion in contact with said front wall section, said corner piece body portion including an outer edge, and a channel-shaped clamp forcibly slidable on said outer edge to a position closely adjacent said flange member front wall section to urge adjacent corner piece body portions toward each other to exert a sealing force upon said flange member front wall sections.

8. A duct joint assembly for connecting the end portions of generally rectangular ducts comprising, a plurality of receiving channels extending upwardly from the end portion of a duct, each of said receiving channels including opposite channel open end portions, a plurality of angular corner pieces for connecting adjacent receiving channels to form a rectangular frame around the duct end portion, said corner pieces each having a body portion with a corner section and a pair of leg portions extending angularly therefrom, said pair of leg portions each including an outer edge and an inner edge, said pair of leg portions arranged to extend through said channel open end portions into said receiving channels to connect adjacent receiving channels on the duct end portion, said leg portions being oppositely positioned with said receiving channels separating said leg portions, said receiving channels including abutment means for engaging said leg portions adjacent said outer and inner edges thereof to rigidly secure said leg portions within said receiving channels so that said leg portions on adjacent duct end portions are maintained a preselected distance apart within said receiving channels, said corner piece corner section including an outer flange edge extending on said corner piece corner section to a position closely adjacent said receiving channel, and a clamp engageable with said corner piece corner sections on said outer flange edges of said oppositely positioned leg portions to compress together said adjacent corner piece body portions to exert a sealing force upon said receiving channels.

9. A method of connecting a duct joint frame to the end portion of a generally rectangular duct comprising the steps of, positioning a first wall section of a frame member in overlying relation with a second wall section to receive the duct end portion therebetween, extending the duct end portion between the first and second wall sections with a first wall end portion spaced from a second wall end portion, restraining forward movement of the duct end portion by abutting contact with a shoulder of the frame member adjacent the first wall end portion, engaging the second wall section to protuberances on the surface of the duct adjacent the end portion thereof to prevent retraction of the duct from between the first and second wall sections, eliminating freedom of movement of the first wall end portion relative to the second wall end portion by connecting the first wall end portion to the second wall end portion by the duct end portion, and maintaining the duct rigidly connected to the first and second wall sections so that the duct end portion remains fixed in abutting relation with the frame member.

10. A duct joint frame for connection to the end portion of a generally rectangular duct comprising, a plurality of flange portions extending upwardly from the end portion of the duct, each of said flange portions being formed by a thin walled member including a first leg having an end portion and a second leg having an end portion, said first leg end portion being laterally spaced from said second leg end portion to form a channel having opposite open end portions, said leg portions being bent relative to one another to form a plurality of wall sections, a plurality of angular corner pieces for connecting adjacent flange portions for forming a frame around the duct end portion, said corner pieces each having a body portion and a pair of leg portions extending angularly from said body portion, each of said leg portions having an upper edge portion and a lower edge portion, said pair of leg portions arranged to extend into said open end portions of said flange portions to connect adjacent flange portions on the duct end portion, a front wall section extending upwardly from said first leg end portion, said pair of corner piece leg portions extending into abutting relation with said front wall sections of adjacent flange portions on the duct end portions, said rear wall section including a bent portion turned inwardly toward said front wall section into abutting relation with said corner piece leg portion to securely hold said corner piece leg portion against said front wall section, a bottom wall section extending substantially horizontally from said front wall section, said bottom wall section arranged to receive said lower edge portion of said corner piece leg portion, and said bottom wall including a shoulder spaced from said front wall section and abutting said lower edge portion of said corner piece leg portion to maintain said lower edge portion in contact with said front wall section.

11. A duct joint frame for connection to the end portion of a generally rectangular duct comprising, a plurality of flange members, each of said flange members being formed by a thin walled sheet of material including a first leg having an end portion and a second leg having an end portion, said first leg end portion being laterally spaced from said second leg end portion, said leg portions being bent relative to one another to form a plurality of wall sections, a first wall section terminating at said first leg end portion, a second wall section terminating at said second leg end portion, said first and second wall sections being positioned in overlying relation to receive an end portion of a duct therebetween, said first leg end portion overlapping a portion of said second wall section to form an abutment shoulder for contacting the duct end portion, said second leg end portion forming a stop for engaging protuberances on the surface of the duct adjacent the duct end portion to maintain the duct end portion in abutting relation with said abutment shoulder to prevent retraction of the duct end portion from between said first and second wall sections, and said stop means on said second leg end portion and said abutment shoulder on said first leg end portion being connected by the duct end portion to provide a rigid connection of said flange member to the duct end portion.

12. A duct joint frame as set forth in claim 11 which includes, a front wall extending upwardly adjacent said abutment shoulder, a locking wall extending horizontally from said front wall to said second leg end portion, said abutment shoulder extending downwardly between the duct end portion and said front wall into overlapping relation with said locking wall, and said abutting shoulder being securely engaged on opposite sides by said front wall and the duct end portion and supported by said locking wall to rigidly connect the duct end portion to the flange.

13. A duct joint frame as set forth in claim 11 in which, said abutment shoulder extends the length of said flange member, said abutment shoulder projecting downwardly from said first leg end portion into surrounding relation with the duct end portion and terminating in an edge portion positioned below the duct end portion, and said abutment shoulder contacting the duct end portion along the entire length of said flange member to rigidly retain the duct end portion therein.

14. A duct joint as set forth in claim 11 which includes, a front wall extending upwardly adjacent said abutment shoulder, said abutment shoulder being positioned in rigid contact with said front wall, said abutment shoulder extending downwardly in an arcuate configuration to an edge portion projecting away from said front wall, said abutment shoulder forming a pocket extending the length of said flange member, said pocket arranged to receive the duct end portion, and said pocket being positioned at said front wall for receiving a sealant material extending longitudinally the length of said flange member and transversely from said abutment shoulder to said stop to sealingly connect the duct end portion within said flange member.

15. A duct joint as set forth in claim 11 in which, said second leg end portion extends horizontally below the duct end portion to said stop means, said stop means including an inturned rebent portion having an upper leg folded in overlying relation with said second leg end portion and terminating in an edge portion extending the length of said flange member, and said edge portion being engageable with the protuberances on the surface of the duct to prevent retraction of the duct end portion from said flange member.

16. A duct joint as set forth in claim 15 which includes, a sealant material in said flange member filling the space between said abutment shoulder and said edge portion of said inturned rebent portion, said sealant material surrounding in sealing contact the surface of the duct within said flange member, said edge portion of said inturned rebent portion contacting the protuberances on the surface of the duct thereby retaining said sealant material in said flange member, and said abutment shoulder contacting the duct end portion to provide a rigid connection of said first and second leg end portions to the duct end portion to securely seal and retain duct end portion in said flange member.

17. A duct joint as set forth in claim 11 in which, said second leg end portion extends horizontally below the duct end portion to form a locking wall, said locking wall including an inturned rebent portion extending upwardly toward said first leg end portion, said inturned rebent portion arranged to receive the duct end portion and maintain the duct end portion in frictional engagement between said first leg end portion and said inturned rebent portion, and said locking wall including a recess for receiving said first leg end portion to permit the duct end portion to extend over said locking wall into abutting relation with said abutment shoulder.

18. A duct joint frame for connection to the end portion of a generally rectangular duct comprising, a plurality of flange members, each of said flange members being formed by a thin walled sheet of material including a first leg having an end portion and a second leg having an end portion, said first leg end portion being laterally spaced from said second leg end portion to form a channel having opposite open end portions, said leg portions being bent relative to one another to form a plurality of wall sections, a plurality of angular corner pieces for connecting adjacent flange members for forming a frame around the duct end portion, said corner pieces each having a corner section with a pair of legs extending angularly therefrom, said legs extending from said corner section in substantially the same plane, said corner section including an offset portion with an end portion displaced laterally from said plane in which said legs extend from said corner section, said corner piece legs arranged to extend into said open end portions of said channels to connect adjacent flange members on the duct end portion, said corner piece corner section offset portion positioned externally of said channel open end portions, a first wall section terminating at said first leg end portion, a second wall section terminating at said second leg end portion, said first and second wall sections being positioned in overlying relation to receive the duct therebetween with the duct end portion extending beyond said corner piece corner section offset portion, said first leg end portion overlapping a portion of said second wall section to form an abutment shoulder for contacting the duct end portion, said second leg end portion forming a stop for engaging protuberances on the surface of the duct adjacent the duct end portion to maintain the duct end portion in abutting relation with said abutment shoulder to prevent retraction of the duct end portion from between said first and second wall sections, and said stop means on said second leg end portion and said abutment shoulder on said first leg end portion being connected by the duct end portion to provide a rigid connection of said flange member to the duct end portion and rigidify said flange member.

* * * * *